United States Patent
Bailey et al.

(10) Patent No.: US 9,543,634 B1
(45) Date of Patent: Jan. 10, 2017

(54) TELESCOPING STRUT WITH FIXED RAIL FEATURE

(71) Applicant: EchoStar Technologies L.L.C, Englewood, CO (US)

(72) Inventors: Matthew Bailey, Centennial, CO (US); William Roberts, Centennial, CO (US)

(73) Assignee: EchoStar Technologies L.L.C., Englewood, CA (US)

( * ) Notice: Subject to any disclaimer, the term of this patent is extended or adjusted under 35 U.S.C. 154(b) by 0 days.

(21) Appl. No.: 14/955,885

(22) Filed: Dec. 1, 2015

(51) Int. Cl.
*A47F 5/00* (2006.01)
*H01Q 1/12* (2006.01)
*F16B 7/14* (2006.01)
*F16M 11/28* (2006.01)

(52) U.S. Cl.
CPC .......... *H01Q 1/1235* (2013.01); *F16B 7/1472* (2013.01); *F16M 11/28* (2013.01); *H01Q 1/1264* (2013.01)

(58) Field of Classification Search
CPC ...... Y10T 403/32467; F16B 7/10; F16B 7/14; F16B 7/1472; F16B 7/105; F16B 2007/16; H01Q 1/1235; H01Q 1/1264; F16M 11/04; F16M 11/28
USPC ......... 248/161, 404, 405, 157, 188.5, 125.8, 248/132, 407, 411, 412, 413, 414
See application file for complete search history.

(56) References Cited

U.S. PATENT DOCUMENTS

| | | | | |
|---|---|---|---|---|
| 620,833 A | * | 3/1899 | Belcher et al. | B62K 19/24 285/322 |
| 939,859 A | * | 11/1909 | Pullen | A47B 13/021 108/148 |
| 1,412,610 A | * | 4/1922 | Foley | B25G 3/02 403/379.3 |
| 1,652,677 A | * | 12/1927 | McCoy | B61H 15/0064 188/196 M |
| 1,711,725 A | * | 5/1929 | Edwards | E21B 15/00 248/354.1 |
| 2,480,382 A | * | 8/1949 | Pagliuso | F16B 7/1472 135/81 |
| 2,531,778 A | * | 11/1950 | Merner | D06F 81/04 108/116 |
| 2,623,573 A | * | 12/1952 | Di Gaetano | B62J 1/06 280/283 |
| 2,653,785 A | * | 9/1953 | La Russa | D06F 53/04 248/353 |
| 2,685,353 A | * | 8/1954 | Caskie | E04H 12/182 135/114 |
| 2,685,876 A | * | 8/1954 | Sanderson | B44C 7/027 126/271.1 |

(Continued)

*Primary Examiner* — Kimberly Wood
(74) *Attorney, Agent, or Firm* — Seed IP Law Group LLP

(57) ABSTRACT

Various embodiments provide a telescoping strut with a fixed rail feature. The telescoping strut includes an outer tube having slits and holes, an inner tube having rail slots and an insert guide, a threaded insert, and bolts. The threaded insert is positioned in the insert guide of the inner tube, which is inserted in the outer tube. The threaded insert, positioned in the insert guide, is aligned with the holes of the outer tube and the rail slots of the inner tube. The bolts are inserted in to the holes and the rail slots, and are threadably attached to the threaded insert. The insert guide and the rail slots allow the threaded insert and the bolts to slide freely with respect to the inner tube. As a result, the inner tube slides freely within the outer tube until the threaded insert and the bolts are tightened. When a desired length of the telescoping strut is obtained, the bolts and the threaded insert are tightened causing the slits of the outer tube to deform around the inner tube.

18 Claims, 6 Drawing Sheets

(56) References Cited

U.S. PATENT DOCUMENTS

| | | | | |
|---|---|---|---|---|
| 2,719,688 | A * | 10/1955 | Seifert | A47F 7/06 248/188.5 |
| 2,776,811 | A * | 1/1957 | Shaffer | B66F 3/08 244/138 R |
| 2,777,692 | A * | 1/1957 | Marzucco | A63B 5/02 116/173 |
| 2,854,303 | A * | 9/1958 | McInnis | A47B 9/20 248/161 |
| 3,103,375 | A * | 9/1963 | McMullin | E04H 12/182 248/188.5 |
| 3,214,187 | A * | 10/1965 | Fuerst | B62B 1/125 248/188.5 |
| 3,265,346 | A * | 8/1966 | Petrick | A45D 20/32 248/414 |
| 3,647,242 | A * | 3/1972 | Pawsat | B62H 1/02 248/188.5 |
| 3,994,467 | A * | 11/1976 | Pike | E21D 15/22 188/372 |
| 4,079,978 | A * | 3/1978 | McMullin | F16B 7/105 15/3.51 |
| 4,385,849 | A * | 5/1983 | Crain | F16B 7/105 343/901 |
| 4,561,798 | A * | 12/1985 | Elcrin | A61B 6/4429 384/35 |
| 4,587,864 | A * | 5/1986 | Kassai | B62B 7/08 16/429 |
| 4,838,291 | A * | 6/1989 | DiVito | A61H 3/02 135/68 |
| 4,926,786 | A * | 5/1990 | White | G08B 7/068 116/2 |
| 5,105,598 | A * | 4/1992 | Wilcox | E04C 3/38 248/354.5 |
| 5,188,331 | A * | 2/1993 | Baines | B60R 11/00 135/16 |
| 5,873,312 | A * | 2/1999 | Mauro-Vetter | B25H 3/06 108/147.21 |
| 7,267,314 | B1 * | 9/2007 | Erickson | F16M 11/04 108/144.11 |

* cited by examiner

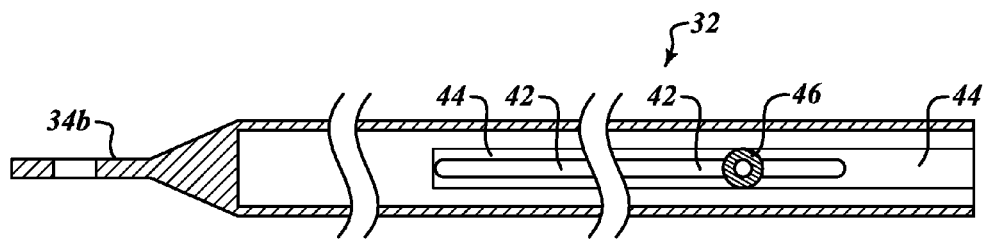
FIG. 6
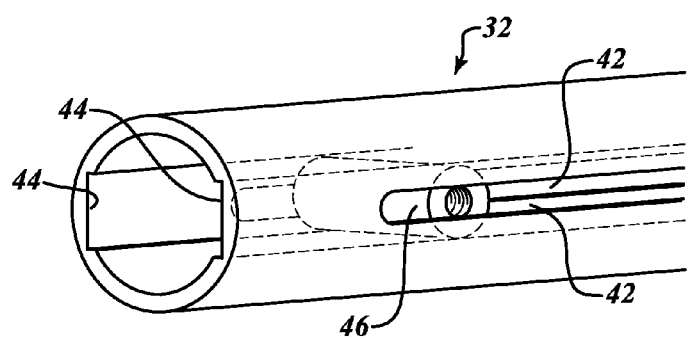
FIG. 7
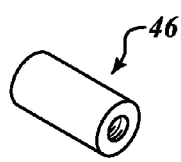 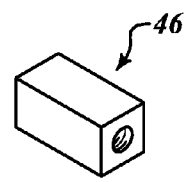
FIG. 8A     FIG. 8B

TELESCOPING STRUT WITH FIXED RAIL FEATURE

BACKGROUND

Technical Field

The present disclosure is directed to a telescoping strut for supporting and positioning an object, such as a satellite antenna.

Description of the Related Art

Satellite antennas are typically mounted to surfaces, such as a roof or a wall of a house, using a mast and two struts. The length of each strut is adjustable to adapt the position of the satellite antenna to the surrounding environment to ensure that signals are properly received. Most struts include an outer tube and an inner tube that is inserted in the outer tube. The outer and inner tubes are secured to each other with a collar clamp. For example, FIG. 1A is a simplified angled view and FIG. 1B a simplified exploded angled view of a strut 10 as is known in the art. The strut 10 includes an outer tube 12 and an inner tube 14 that is inserted in the outer tube 12. The outer tube 12 and the inner tube 14 are coupled together with a collar clamp 16, a bolt 18, and a nut 20. Namely, the collar clamp 16 is clenched around the outer tube 12 by tightening the bolt 18 and the nut 20. This, in turn, causes the outer tube 12 to deform around the inner tube 14. As a result, the inner tube 14 is held in position by the surface contact between the outer tube 12 and the inner tube 14.

Collar clamps, however, do not provide uniform surface contact between the outer and inner tube. Namely, the collar clamp anchors the outer tube to the inner tube primarily on the side where the bolt and nut are located. For example, the surface contact between the outer tube 12 and the inner tube 14 is predominantly located on the side where the bolt 18 and the nut 20 are tightened. As such, collar clamps create limited surface contact between an outer and inner tube. Consequently, natural forces, such as wind or rain, may cause the inner tube to unintentionally slide within the outer tube and in turn cause the satellite antenna to move out of position, thus, degrading reception. Therefore, it is desirable to mount a satellite antenna to a surface using adjustable struts that are held securely in position to ensure pointing accuracy of a satellite antenna and minimize poor reception of signals. In addition, the inner tube 14 may slide completely out of the outer tube 12 and be dropped on the job site, requiring retrieval when the installation is on the roof, or worse, may be lost in transit or at the job site, rendering the entire strut useless.

BRIEF SUMMARY

The present disclosure provides a telescoping strut with a fixed rail feature.

According to one embodiment, the telescoping strut includes an outer tube having slits and holes, an inner tube having rail slots and an insert guide, a threaded insert, and bolts. The threaded insert is positioned in the insert guide of the inner tube, which is inserted in the outer tube. The outer tube and the inner tube are secured to each other by the threaded insert and the bolts. Particularly, the threaded insert, positioned in the insert guide, is aligned with the holes of the outer tube and the rail slots of the inner tube. The bolts are inserted into the holes and the rail slots, and are threadably attached to the threaded insert. The insert guide and the rail slots allow the threaded insert and the bolts to slide freely with respect to the inner tube. As a result, the inner tube slides freely within the outer tube until the threaded insert and the bolts are tightened. When a desired length of the telescoping strut is obtained, the bolts and the threaded insert are tightened causing the slits of the outer tube to deform around the inner tube.

The telescoping strut disclosed herein results in a strut that is adjustable in length and is not susceptible to slippage or torsional deflection caused by natural forces, such as wind or rain. Further, the inner tube is coupled to the outer tube, even when the inner tube is moveable. Having even one bolt in the threaded insert will hold all parts together as a single unit. The use of two bolts provides a more reliable connection than is possible with just a single bolt.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

FIG. 6 is a simplified cross-sectional view of an inner tube of a telescoping strut according to one embodiment as disclosed herein.

FIG. 7 is a simplified angled view of one end of the inner tube of FIG. 6.

FIG. 8A is a simplified angled view of a threaded insert of a telescoping strut according to one embodiment as disclosed herein.

FIG. 8B is a simplified angled view of a threaded insert of a telescoping strut according to another embodiment as disclosed herein.

DETAILED DESCRIPTION

Figure 1A:
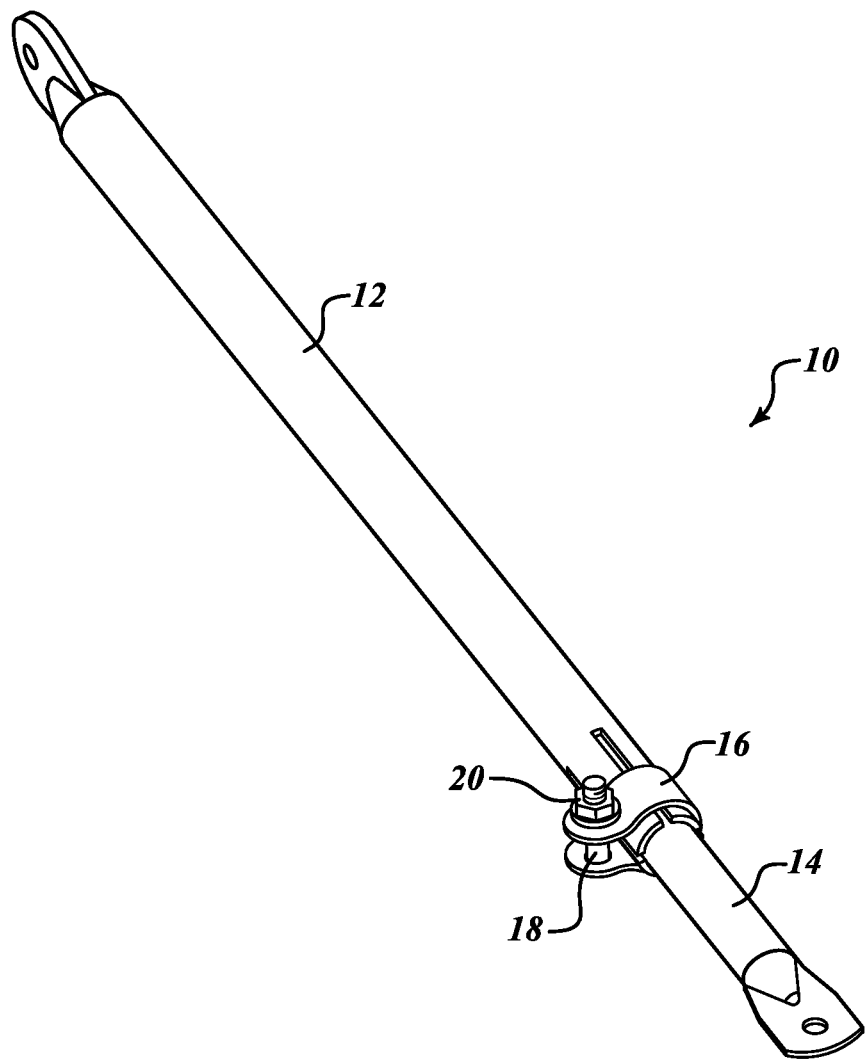
FIG. 1A is a simplified angled view of a strut as is known in the art.
Figure 1B:
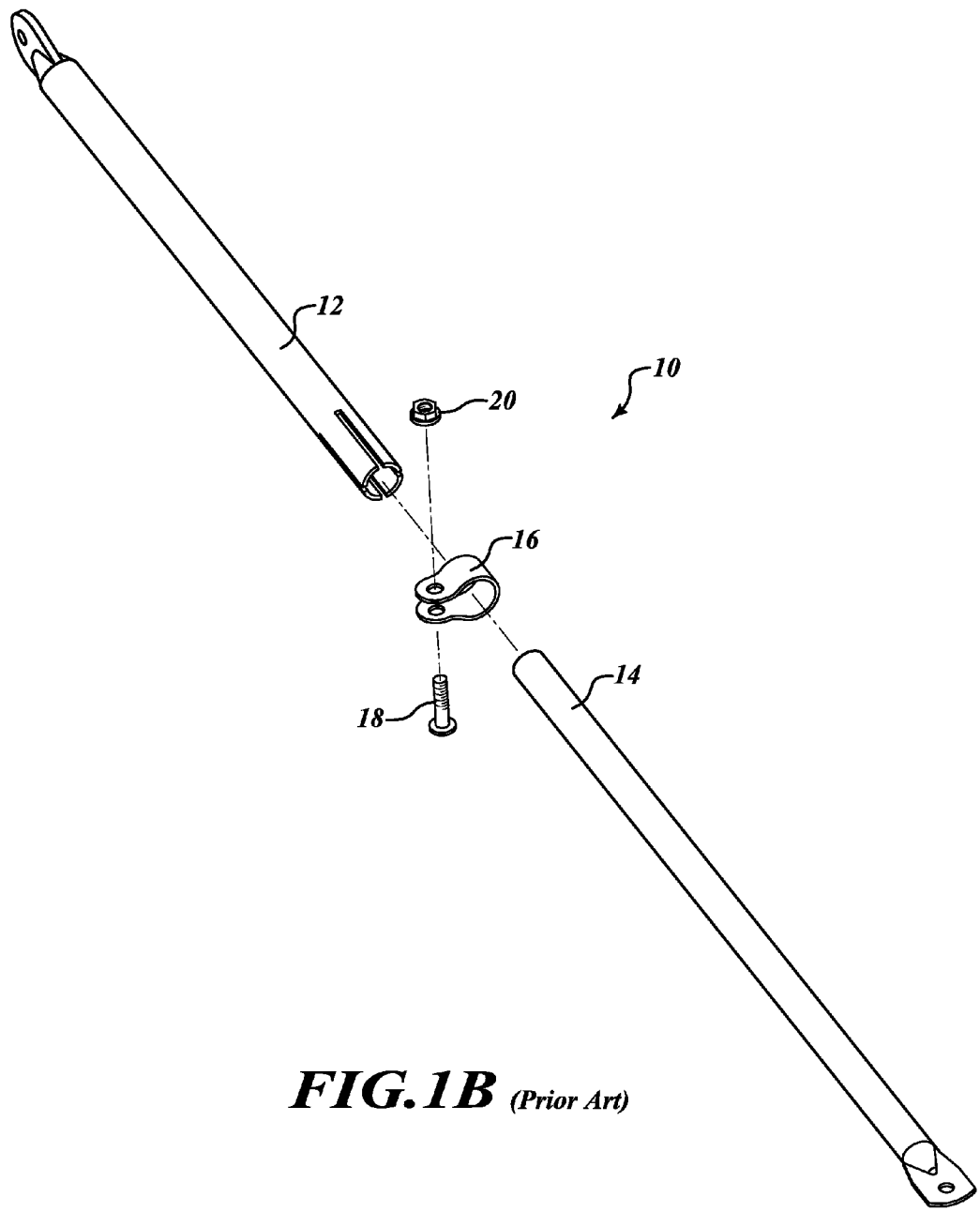
FIG. 1B is a simplified exploded angled view of the strut of FIG. 1A.

In the following description, certain specific details are set forth in order to provide a thorough understanding of various embodiments of the disclosure. However, one skilled in the art will understand that the disclosure may be practiced without these specific details. In some instances, well-known details associated with struts have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Figure 2:
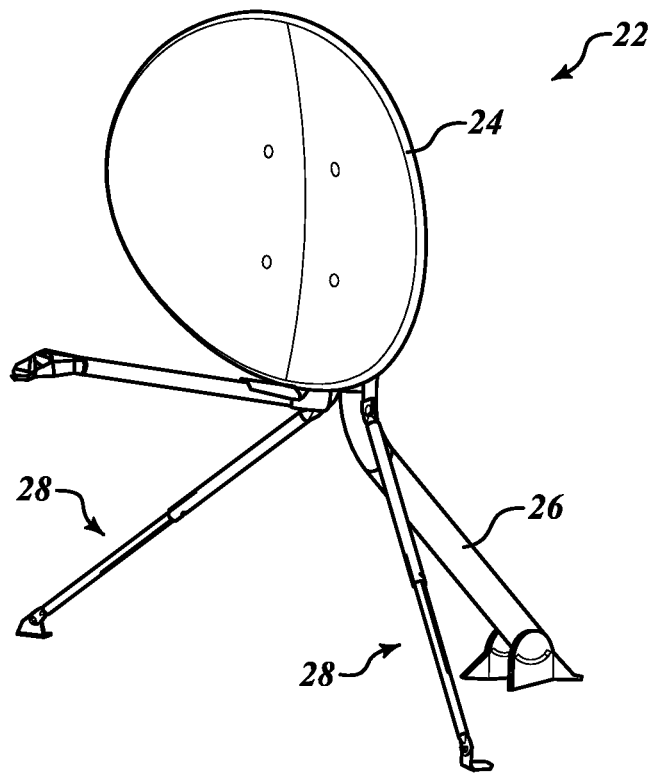
FIG. 2 is simplified angled view of a system that includes a telescoping strut according to one embodiment as disclosed herein.

FIG. 2 is simplified angled view of a system 22 that includes a telescoping strut 28 according to principles disclosed herein. The system 22 includes a satellite antenna 24, a mast 26, and telescoping struts 28.

The satellite antenna 24 is configured to receive signals, such as data transmissions or television broadcasts, from a satellite as is known in the art. The satellite antenna 24 may consist of a receive only or a two way, receive and transmit system. The satellite antenna 24 is mounted to a surface, such as a wall or roof of a house, by the mast 26 and the telescoping struts 28. Particularly, the satellite antenna 24 is attached to ends of the mast 26 and the telescoping struts 28, and the other ends of the mast 26 and the telescoping struts 28 are attached to the surface. The mast 26 and the telescoping struts 28 are each adjustable to allow the position of the satellite antenna 24 to be adapted to the surrounding environment and maximize signal reception. The mast 26 is configured to rotate upward and downward as is known in the art. Each of the telescoping struts 28 are configured to increase or decrease in length. The telescoping strut 28 will be discussed in further detail herein.

Figure 3A:
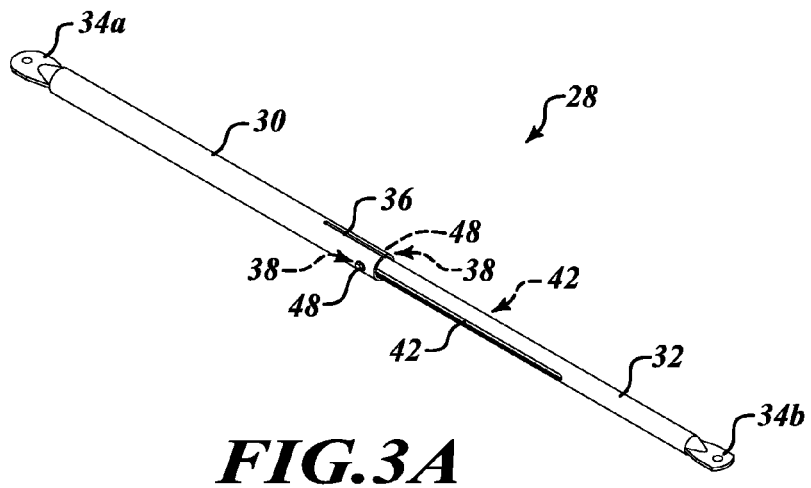
FIG. 3A is a simplified angled view of a telescoping strut according to one embodiment as disclosed herein.
Figure 3B:
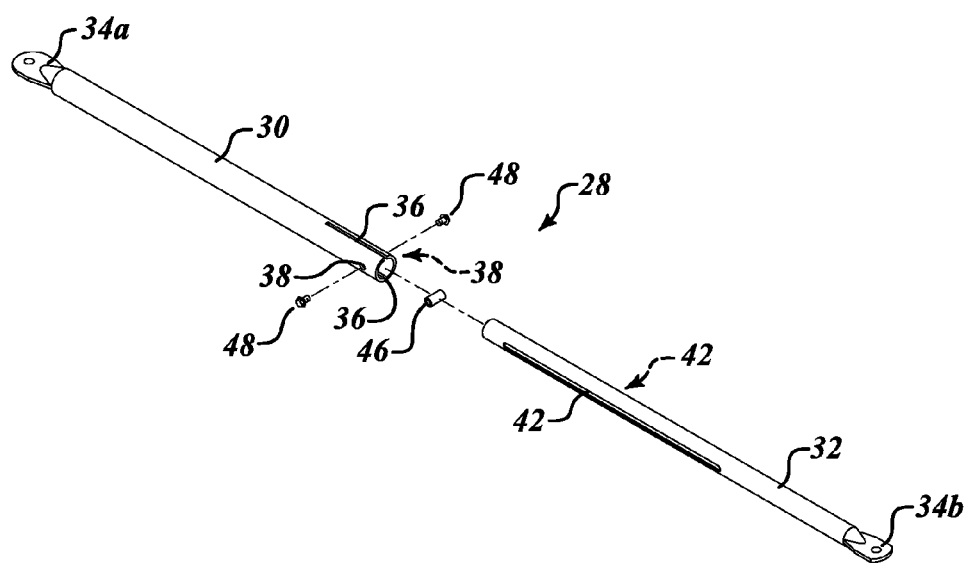
FIG. 3B is a simplified exploded angled view of the telescoping strut of FIG. 3A.

FIG. 3A is a simplified angled view and FIG. 3B is a simplified exploded angled view of the telescoping strut 28 according to principles disclosed herein. The telescoping strut 28 includes an outer tube 30, an inner tube 32, a threaded insert 46, and bolts 48.

Figure 4:
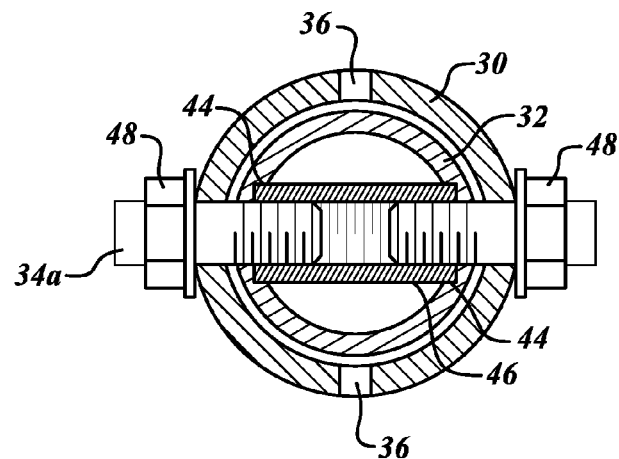
FIG. 4 is a simplified cross-sectional view of the telescoping strut of FIGS. 3A and 3B.
Figure 5A:
FIG. 5A is a simplified view of an outer tube of a telescoping strut according to one embodiment as disclosed herein.
Figure 5B:
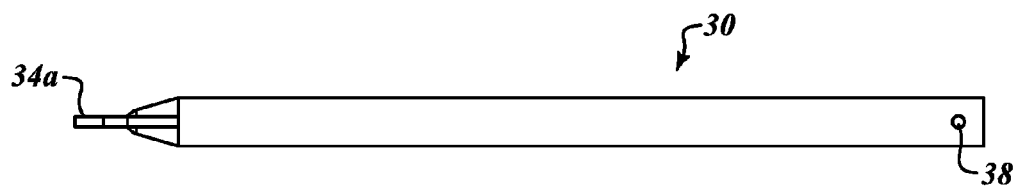
FIG. 5B is a simplified side view of the outer tube of FIG. 5A.

It is beneficial to review FIG. 3A and FIG. 3B simultaneously with FIGS. 4, 5A, 5B, 6, 7, 8A, and 8B. FIG. 4 is a simplified cross-sectional view of the telescoping strut 28. FIG. 5A is a simplified view of the outer tube 30. FIG. 5B is a simplified side view of the outer tube 30. FIG. 6 is a simplified cross-sectional view of the inner tube 32. FIG. 7 is a simplified angled view of one end of the inner tube 32. FIG. 8A is a simplified angled view of the threaded insert 46. FIG. 8B is a simplified angled view of a threaded insert 46 having a different shape, according to another embodiment.

The outer tube 30 and the inner tube 32 include a mount 34a and a mount 34b, respectively. Mount 34a and mount 34b are each configured to attach to an object or a surface by using a bolt and nut, a screw, or any other type of fastener. In a preferred embodiment, the mount 34a is attached to the satellite antenna 24, and the mount 34b is attached to a surface.

The outer tube 30 further includes slits 36 and holes 38. As shown in FIGS. 4 and 5A, the slits 36 are aligned with each other and are positioned on opposite sides of the outer tube 30. As will be discussed further herein, the slits 36 allow the outer tube 30 to be deformed around the inner tube 32 when the threaded insert 46 and the bolts 48 are tightened. As shown in FIGS. 3B and 5B, the holes 38 are aligned with each other and are positioned on opposite sides of the other tube 30. As will be discussed further herein, the bolts 48, as shown in FIGS. 3A, 3B, and 4, are inserted in to the holes 38. In a preferred embodiment, the slits 36 are aligned along a first axis and the holes are aligned along a second axis that is substantially perpendicular to the first axis. As shown in FIG. 4, the bolts 48 are inserted in to the holes 38.

The inner tube 32 further includes rail slots 42 and an insert guide 44. As shown in FIGS. 3B and 7, the rail slots 42 are aligned with each other and are positioned on opposite sides of the inner tube 32. In a preferred embodiment, the rail slots 42 each have length that is larger than half the length of the inner tube 32. As will be discussed further herein, the bolts 48, as shown in FIGS. 3A, 3B, and 4, are inserted in to the rail slots 42. In contrast to the holes 38, the rail slots 42 allow the bolts 48 to move freely when inserted. The insert guide 44, as shown in FIGS. 6 and 7, is inside the inner tube 32. The insert guide 44 extends from the end opposite from the mount 34b to the end of the rail slots 42 closest to the mount 34b. The insert guide 44 is configured to receive the threaded insert 46 and align the threaded insert 46 with the rail slots 42. When inserted, the threaded insert 46 may slide freely within the insert guide 44.

The threaded insert 46 includes a threaded inner portion configured to be threadably attached to the bolts 48. Particularly, as shown in FIG. 4, each of the bolts 48 are threaded and screw in to opposite sides of the threaded insert 46. For example, the bolts 48 may be standard hex bolts. In one embodiment, as shown in FIG. 8A, the threaded insert 46 is a cylindrical tube. In another embodiment, as shown in FIG. 8B, a rectangular threaded insert 46 is used. As previously discussed, the threaded insert 46 is inserted in to the insert guide 44.

Once the threaded insert 46 is positioned in the insert guide 44 of the inner tube 32 and the inner tube 32 is inserted in to the outer tube 30 as shown in FIG. 3A, at least one bolt 48 is threaded into the insert. The inner tube 32, as shown in FIGS. 3A and 4, has a diameter that is smaller than the diameter of the outer tube 30. The outer tube 30 and the inner tube 32 are secured to each other by using the threaded insert 46 and the bolts 48. Particularly, as shown in FIGS. 3A and 4, the threaded insert 46 is positioned in the insert guide 44 and is aligned with the holes 38 and the rail slots 42. The bolts 48 are inserted in to the holes 38 and the rail slots 42, and screwed in to the threaded insert 46. As previously discussed, the insert guide 44 and the rail slots 42 allow the threaded insert 46 and the bolts 48 to slide freely with respect to the inner tube 32, even when only one bolt 48 is in the insert 46. As a result, the inner tube 32 slides freely within the outer tube until the threaded insert 46 and the bolts 48 are tightened, yet cannot be removed. Therefore, the telescoping strut 28 may increase or decrease in length by sliding the inner tube 32 within the outer tube 30, but will not be released and drop out. In order to fully remove inner tube 32, both bolts 48 must be removed completely from the insert 46. The tubes 30 and 32 are, therefore, held together in a slideable, but not releasable, connection.

When a desired length of the telescoping strut 28 is obtained, the bolts 48 and the threaded insert 46 are tightened causing the slits 36 of the outer tube 30 to deform around the inner tube 32. Consequently, as shown in FIG. 4, portions of the inside of the outer tube 30 that are near the bolts 48 contact corresponding portions of the outside of the inner tube 32. Simultaneously, each end of the threaded insert 46 contacts corresponding portions of the insert guide 44 of the inner tube 32. Therefore, the telescoping strut 28 has at least four points of surface contact. The increased surface contact area ensures that the inner tube 32 is securely held in position in the outer tube 30.

The telescoping strut 28 disclosed herein results in a strut that is adjustable in length and is not susceptible to slippage, removal, or torsional deflection caused by natural forces, such as wind or rain.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A telescoping strut, comprising:
    an outer tube having a first end and a second end opposite the first end, the first end including a first mount, the second end including first and second slits and first and second holes;
    an inner tube having a third end and a fourth end opposite the third end, the third end including an insert guide and first and second rail slots, the fourth end including a second mount, the third end being positioned in the second end of the outer tube;
    a threaded insert positioned in the insert guide of the inner tube; and
    first and second threaded bolts, the first and second threaded bolts extending in the first and second holes of the outer tube and the first and second rail slots of the inner tube, and being threadably attached to respective sides of the threaded insert.

2. The telescoping strut of claim 1, wherein the first and second slits are positioned on opposite sides of the outer tube and the first and second holes are positioned on opposite sides of the outer tube.

3. The telescoping strut of claim 2, wherein the first and second slits are aligned along a first axis and the first and second holes are aligned along a second axis that is perpendicular to the first axis.

4. The telescoping strut of claim 1, wherein the insert guide is inside the inner tube.

5. The telescoping strut of claim 1, wherein the first and second rail slots are substantially equal in length and extend along the length of a inner tube.

6. The telescoping strut of claim 1, wherein the first and second rail slots are elongated holes in the insert guide.

7. A system, comprising:
    an antenna;
    a telescoping strut, including:
        an outer tube having a first end and a second end opposite the first end, the first end including a first mount, the second end including first and second slits and first and second holes, the antenna being attached to the first mount;
        an inner tube having a third end and a fourth end opposite the third end, the third end including an insert guide and first and second rail slots, the fourth end including a second mount, the third end being positioned in the second end of the outer tube;
        a threaded insert positioned in the insert guide of the inner tube; and
        first and second threaded bolts, the first and second threaded bolts extending in the first and second holes of the outer tube and the first and second rail slots of the inner tube, and being threadably attached to respective sides of the threaded insert.

8. The system of claim 7, wherein the first and second slits are positioned on opposite sides of the outer tube and the first and second holes are positioned on opposite sides of the outer tube.

9. The system of claim 8, wherein the first and second slits are aligned along a first axis and the first and second holes are aligned along a second axis that is perpendicular to the first axis.

10. The system of claim 7, wherein the insert guide is inside the inner tube.

11. The system of claim 7, wherein the first and second rail slots are substantially equal in length and extend along a length of the inner tube.

12. The system of claim 7, wherein the first and second rail slots are elongated holes in the insert guide.

13. A strut, comprising:
    an outer tube having a first open end, the first open end including first and second slits and first and second holes, the first and second slits positioned on opposite sides of the outer tube, the first and second holes positioned on opposite sides of the outer tube;
    an inner tube having a second open end, an insert guide inside the inner tube, and first and second rail slots, the first and second rail slots positioned on opposite sides of the inner tube, the second open end positioned in the first open end of the outer tube, the first and second rail slots being aligned with the first and second holes of the outer tube;
    an insert positioned in the insert guide of the inner tube; and
    first and second bolts, the first and second bolts extending in the first and second holes of the outer tube and the first and second rail slots of the inner tube, the first and second bolts being attached to respective sides of the insert positioned in the insert guide.

14. The strut of claim 13, wherein the insert positioned in the insert guide is a threaded insert.

15. The strut of claim 14, wherein the first and second bolts are threaded bolts and are threadably attached to respective sides of the threaded insert.

16. The strut of claim 13, wherein the first and second slits are aligned along a first axis and the first and second holes are aligned along a second axis that is perpendicular to the first axis.

17. The strut of claim 13, wherein the first and second rail slots are substantially equal in length and extend along a length of the inner tube.

18. The strut of claim 13, wherein the first and second rail slots are elongated holes in the insert guide.

* * * * *

UNITED STATES PATENT AND TRADEMARK OFFICE
CERTIFICATE OF CORRECTION

| | |
|---|---|
| PATENT NO. | : 9,543,634 B1 |
| APPLICATION NO. | : 14/955885 |
| DATED | : January 10, 2017 |
| INVENTOR(S) | : Matthew Bailey et al. |

It is certified that error appears in the above-identified patent and that said Letters Patent is hereby corrected as shown below:

In the Claims

Column 5, Line 49:
"along the length of a inner tube." should read, --along a length of the inner tube.--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*